（12）United States Patent
Naslund et al.

(10) Patent No.: US 8,819,765 B2
(45) Date of Patent: Aug. 26, 2014

(54) SECURITY POLICY DISTRIBUTION TO COMMUNICATION TERMINALS

(75) Inventors: Mats Naslund, Bromma (SE); Michael Liljenstam, Solna (SE); Karl Norrman, Stockholm (SE); Bengt Sahlin, Espoo (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1069 days.

(21) Appl. No.: 12/863,746

(22) PCT Filed: Jan. 22, 2008

(86) PCT No.: PCT/SE2008/050063
§ 371 (c)(1),
(2), (4) Date: Jul. 20, 2010

(87) PCT Pub. No.: WO2009/093938
PCT Pub. Date: Jul. 30, 2009

(65) Prior Publication Data
US 2010/0293595 A1    Nov. 18, 2010

(51) Int. Cl.
*G06F 17/00* (2006.01)
*H04L 29/06* (2006.01)

(52) U.S. Cl.
USPC ............................................ 726/1; 370/328

(58) Field of Classification Search
USPC ................................ 726/1; 370/328; 455/411
See application file for complete search history.

(56) References Cited

U.S. PATENT DOCUMENTS 6,662,188 B1 * 12/2003 Rasmussen et al. .................. 1/1
7,096,359 B2 * 8/2006 Agrawal et al. ............... 713/168
2003/0147363 A1 * 8/2003 Ala-Luukko ................. 370/328
2004/0185829 A1    9/2004 Vinck
2008/0123851 A1 * 5/2008 Guccione et al. ............. 380/270
2010/0095123 A1 * 4/2010 He ................................ 713/171
2011/0022843 A1 * 1/2011 Blom et al. .................... 713/169
2011/0134916 A1 * 6/2011 Panwar et al. ................ 370/389
2012/0066737 A1 * 3/2012 Zhang et al. ...................... 726/1

FOREIGN PATENT DOCUMENTS

| EP | 1448000 A1 | 8/2004 |
| EP | 1701505 A1 | 9/2006 |
| EP | 1713289 A1 | 10/2006 |
| EP | 1827049 A2 | 8/2007 |
| GB | 2356530 A | 5/2001 |
| WO | 2008/048179 A2 | 4/2008 |

OTHER PUBLICATIONS

Olivier Benoit; Mobile Terminal Security; Year: 2004; Dublin City University, Glasnevin, Dublin 9, Ireland; pp. 1-24.*

(Continued)

*Primary Examiner* — Mohammad W Reza
*Assistant Examiner* — Monjour Rahim
(74) *Attorney, Agent, or Firm* — Coats & Bennett, PLLC (57) ABSTRACT

A method and arrangement for distributing a security policy to a communication terminal having an association with a home communication network, but being present in a visited communication network. The home communication network generates its own preferred security policy Ph and the visited communication network generates its own preferred security policy Pv. A communication network entity in the visited communication network combines the security policies and selects security algorithms and/or functions to apply from the combined security policy. By generating security policy vectors of both networks and combining them before the security algorithms are selected, both networks are able to influence the selection without requiring the use of signaling messages.

14 Claims, 6 Drawing Sheets

(56) References Cited

OTHER PUBLICATIONS

ETSI, "Universal Mobile Telecommunications System (UMTS); 3G security; Security architecture (3GPP TS 33.102 version 7.1.0 Release 7)", ETSI TS 133 102 V7.1.0, pp. 1-65, Dec. 2006, Sophia Antipolis Cedex, France.

Nokia, et al., "Security algorithm negotiation in SAE/LTE networks", 3GPP TSG SA WG3 Security—SA3#46, pp. 1-12, Feb. 13-16, 2007, Beijing, China, S3-070100.

* cited by examiner

SECURITY POLICY DISTRIBUTION TO COMMUNICATION TERMINALS

TECHNICAL FIELD

The present invention relates generally to security policy distribution for communication terminals in communication networks. In particular, the present invention can be used for selecting an appropriate security policy for a communication terminal present in a visited telecommunication network and having an association with its home telecommunication network.

BACKGROUND

In a communication system, a communication terminal can be present in a visited communication network or in its home communication network. Communication between the terminal and the networks typically needs to be secured and there exists several security algorithms for integrity protection, encryption and decryption. Each network may accept or prefer to use some of these security algorithms for integrity protection, encryption and decryption.

This description is generally concerned with a mobile terminal having an association (e.g. subscription) with its own home telecommunication network (Home Public Land Mobile Network, HPLMN), but currently being present in a visited telecommunication network (Visited Public Land Mobile Network, VPLMN), providing network connectivity. As a special case, the HPLMN and the VPLMN may be one and the same network. However, each of the communication terminals referred to in this description can be any type of terminal connected to a visited (or home) communication network, e.g. a wireless or non-wireless phone, a computer connected to a local area network (LAN), etc.

Figure 1:
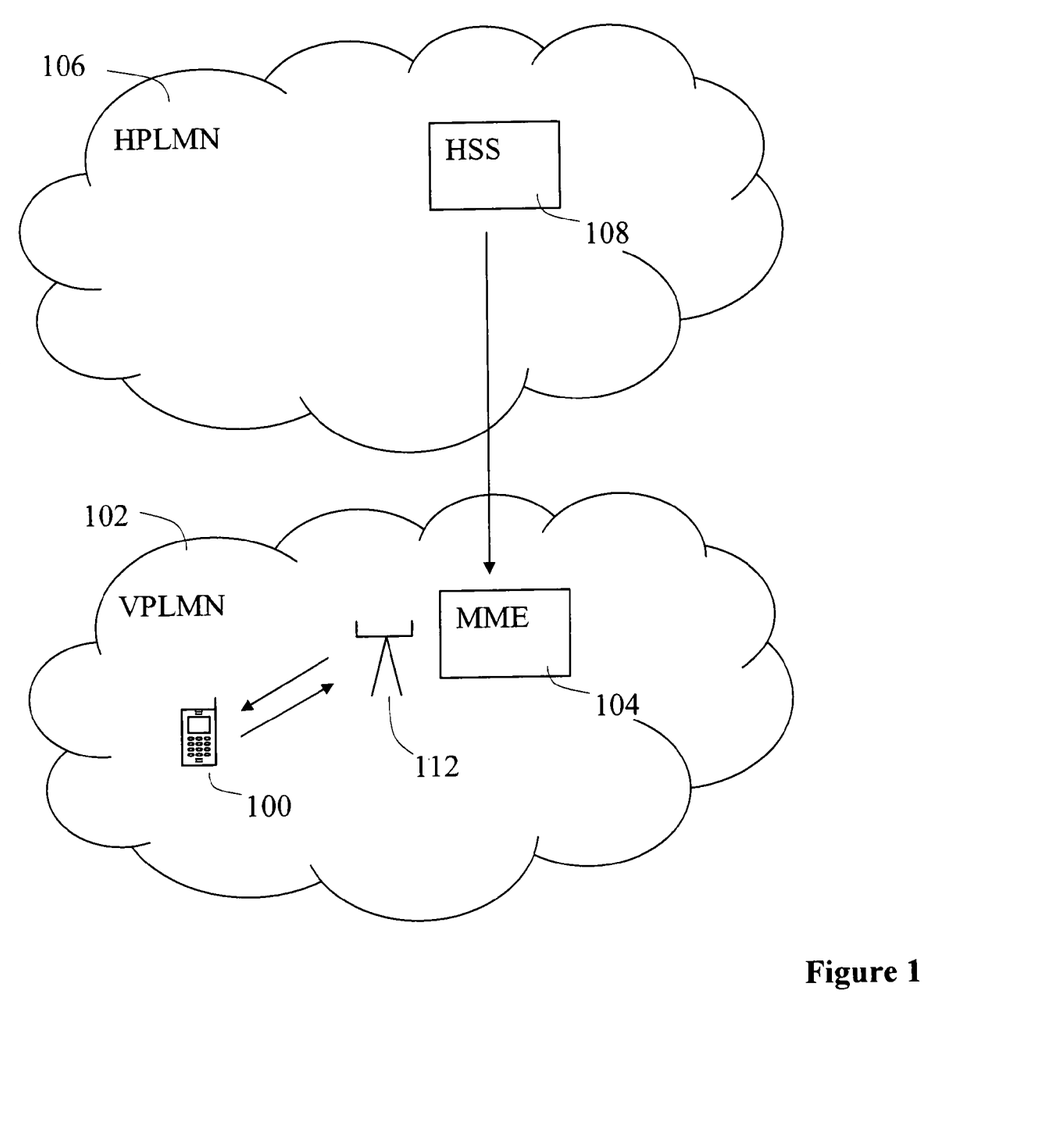
FIG. 1 is a basic overview illustrating a scenario where a communication terminal having an association with one communication network but is present in another network.

With reference to FIG. 1, a communication terminal 100 is present in a visited telecommunication network, VPLMN 102 and communicates with other terminals and/or application functions in the VPLMN 102 or in its own home telecommunication network HPLMN 106. For secure communication, any conventional security algorithms can be used, such as A5/1, A5/2, A5/3, A5/4, UEA1, UEA2, used in 2G/3G mobile networks etc. The security algorithms have different security properties, i.e. they have different "strengths" in protecting information. A Mobility Management Entity (MME) 104 in the VPLMN 102 comprises information of which security algorithms being supported and accepted by the VPLMN 102 for user Authentication and Key Agreement (AKA). The HPLMN 106 deploys a user database, Home Subscriber Server (HSS) 108, which likewise comprises information of which security algorithms being supported and accepted by the HPLMN 106. A Radio Base Station (RBS) 112 in the VPLMN 102, to which the communication terminal 100 is currently connected, communicates with the communication terminal 100. A security algorithm being supported and accepted by the VPLMN 102 is used for securing the communication.

As mentioned, the security algorithms have different strengths, and at any point in time there is always a risk that an algorithm previously considered secure is found to be more or less flawed. If a security algorithm is found to be unsecure, there are some methods generally available today for preventing the algorithm from being used, which will be briefly described in the sections below.

Upgrade Radio Base Stations

An unsecure security algorithm can be removed and preferably replaced with a different, stronger one. However, the security algorithms are typically implemented by means of hardware and placed in each radio base station, RBS. Removing an unsecure security algorithm from each RBS, where it is stored, is a very time-consuming and expensive procedure.

Special RAND

The signalling information for the authentication communication comprises a RAND value in the AKA protocol. In mobile communication, RAND is a random value, and AKA (Authentication and Key Agreement) is a standardised challenge-response protocol, which are therefore not necessary to describe in more detail here.

The HPLMN (HSS) issues the RAND value, and can use a part of that value to define which security algorithms are deemed acceptable to the HPLMN. For instance, the security algorithm A5/j is deemed acceptable if, and only if, the j:th bit of the RAND value is "1". This method is referred to as "Special RAND" and was earlier proposed in 3GPP SA3 [Orange and Nokia, "Introducing the special RAND mechanism as a principle for GSM/GPRS", S3-040529, SA3#34, 6-9 July, Acapulco, Mexico or Orange and Vodafone, "Further development of the Special RAND mechanism", S3-030588, SA3#30, 7-10 Oct., 2003]. However, using a part of the RAND value to declare which security algorithms are acceptable to the HPLMN decreases the entropy/randomness of the RAND value. Furthermore, with the "special RAND" solution the security algorithm policy will be controlled mainly by the HPLMN, and the operator of the VPLMN will have some difficulty to influence the security algorithm policy.

Key Separation

Separate encryption keys can be used with different algorithms. For instance, an encryption key can be calculated by a function, where an original base key and some identifier for the algorithm are used as input to the function. If, e.g., a so-called "hash" function is applied, the encryption key can be calculated as encryption key=hash(base_key, <algorithm_ID>). This method will assure that different algorithms get distinct keys.

The benefit of this is that if one of the algorithms is broken, and it can be assumed that any key used with that algorithm has been compromised, it is generally not a problem that the same key is used with a different (secure) algorithm. If the same key is used with several algorithms, an attacker might be able to break the insecure algorithm, obtain the key and then provoke the terminal into using the broken key with a secure algorithm.

This is useful practice to prevent a weakness in one algorithm to spread to another algorithm, but it does not prevent that the broken algorithm is used as such. Calculating an additional encryption key also consumes a certain amount of calculation capacity.

Use of Authentication Management Field (AMF)

According to the AKA Protocol, the AUTN (Authentication Token) comprises an Authentication Management Field (AMF), which can be used for conveying information on the selected security algorithm from the HPLMN to the communication terminal. The communication terminal comprises a USIM (UMTS Subscriber Identity Module) and a mobile entity. The use of the AMF is hitherto specified to be an operator proprietarily defined field. Using the AMF for a different purpose can be difficult possibly due to conflicts with any existing use thereof. In addition, by using the AMF only the HPLMN will be capable of controlling the security algorithm policy, since the AMF is integrity protected from the HSS in the HPLMN all the way to the USIM.

Hence, there are certain problems associated with the existing solutions outlined above. First, updating the radio base stations is typically a very time-consuming and expensive procedure.

Another problem is that by using existing signalling messages or parts thereof, as in the "special RAND" or "AMF" solutions, the existing signalling messages will at least partly lose their information capacity, and other use of these messages is also prevented. Using, e.g., a part of the RAND message for distribution of a security algorithm policy degrades the entropy or randomness of the RAND value. Additionally, even if the usage of the AMF-field is unspecified in the AKA protocol, other use thereof may still exist. In addition, in environments with nodes and terminals from different releases, backward compatibility issues typically gives rise to serious problems. Therefore, it is preferred not to use the AMF or part of the RAND message for transmitting information regarding the security algorithm to be used, in the communication between nodes or elements in the communication networks.

Yet another problem is that when using the existing solutions, only the HPLMN or the VPLMN is capable of controlling the security algorithm policy. In particular, it is important to note that in the VPLMN, security policies are usually under control of the MME (or similar entity) which can be considered a fully trustworthy entity whereas the actual implementation of the security algorithms is typically the responsibility of another node (e.g. the radio base station) which is usually less trustworthy. From the user/terminal point of view, there is therefore a need to be able to securely verify that the security algorithm chosen (by the base station) is in compliance with both the security policy of the HPLMN (HSS) and VPLMN (MME).

SUMMARY

It is an object of the present invention to address at least some of the problems outlined above. Furthermore, it is an object of the present invention to provide a solution for enabling a secure and flexible distribution of security policies to a communication terminal without affecting existing signalling messages.

These objects and others may be obtained by a method and an apparatus according to the attached independent claims.

According to one aspect, a method is provided for providing security to a communication terminal having an association with a home communication network but being present in a visited network. The home communication network comprises a communication network entity, where a first security policy vector Ph associated with the home communication network is generated. The security policy vector may comprise a predefined number of values, each value representing one preferred security algorithm or required security function. Furthermore, is a first and a second key generated. A first integrity protection tag PhA, dependent on the first security policy vector and at least the first key is also generated. The first security policy vector Ph, the second key and the first integrity protection tag PhA are transmitted to the second communication network.

According to another aspect, a communication network entity is provided for providing security to a communication terminal having an association with a home communication network but being present in a visited network. In the home communication network, a communication network entity is present, the network entity comprising a generation unit adapted to generate a first security policy vector Ph, a first and a second key, and an integrity protection tag PhA based on the security policy vector Ph and at least the first key. The communication network entity comprises also a communication unit adapted to transmit the first security policy vector Ph, the second key, and the first integrity protection tag PhA to the second communication network.

According to a further aspect, a method is provided for providing security to a communication terminal having an association with a home communication network but being present in a visited network. The visited communication network comprises a communication network entity, where a first security policy vector Ph associated with the home communication network is received. Optionally, from the first communication network a second key and a first integrity protection tag PhA may also be received. A second security policy vector Pv associated with security policy of the visited communication network is generated. Optionally, second integrity protection tag PvA may also be generated. The second integrity protection tag PvA is dependent on at least the first security policy vector and the received second key. The security policy vectors Ph and Pv are then transmitted to the communication terminal. Optionally, the integrity protection tags PhA and PvA are also transmitted to the communication terminal. The selection of which security algorithms and/or security functions to apply is performed by the communication network entity in the visited communication network or by another entity, e.g. a Radio Base Station (RBS). In the case when the selection is performed in the communication network entity, at least one security algorithm and/or at least one security function is selected in accordance with the security policy vectors Ph and Pv, and the communication terminal is informed which security algorithms/functions being selected. In the case when the selection is performed by another entity on the other hand, the communication network entity combines the security policy vectors Ph and Pv into a third security policy vector P and transmits the third security policy vector P to the other entity.

According to a still further aspect, a communication network entity is provided for providing security to a communication terminal having an association with a home communication network but being present in a visited network. In the visited communication network, a communication network entity is present, the network entity comprising a first communication unit adapted to receive a first security policy vector Ph. Optionally, the first receiving unit may also be adapted to receive a second key and a first integrity protection tag PhA. A generation unit is adapted to generate a second security policy vector Pv. Optionally, the generation unit may also be adapted to generate a second integrity protection tag PvA, dependent on the received second key and the generated second security policy vector Pv. A combination unit is adapted to combine the security policy vectors Ph and Pv into a third security policy vector P. As described above, the selection of security functions and/or security algorithms can be performed in either the communication network entity or in another entity. In the case when the selection is performed in the communication network entity, a selection unit is adapted to select which security functions and/or security algorithms to apply, and a second communication unit is adapted to transmit to the communication terminal the security policy vectors Ph and Pv, and the output from the selection unit. In the case when another entity performs the selection, the second communication unit is instead adapted to transmit the third security policy vector to the other entity.

According to another aspect, a method is provided for providing security to a communication terminal having an association with a home communication network but being present in a visited network. The communication terminal receives a first security policy vector Ph associated with the security policy of the first communication network, and a second security policy vector Pv associated with the security policy of the second communication network. Optionally, a first integrity protection tag PhA dependent on at least the first security policy vector Ph and a second integrity protection tag PvA dependent on at least the second security policy vector Pv may also be received. Furthermore the communication terminal receives information regarding which security algorithms/functions which have been selected. Then the terminal verifies the selected security algorithms/functions against the received security policy vectors. Optionally, the integrity protection tags may also be verified, by generating a first and a second key and generate a third and a fourth integrity protection tag PhA2 and PvA2, and comparing with the received integrity protection keys PhA and PvA, respectively. The generation of the third and fourth integrity tags are performed in the corresponding way as the first and second integrity tags, but locally in the communication terminal.

According to further another aspect, a communication network terminal is provided having an association with a home communication network but being present in a visited network. The communication terminal comprises a communication unit adapted to receive a first and a second security policy vector Ph, Pv, and information regarding the selected security functions/algorithms. Optionally, the communication unit may also be adapted to receive a first and a second integrity protection tag PhA, PvA. A verifying unit is adapted to verify that the selection of security algorithms/functions are in accordance with the received security policy vectors Ph, Pv. Optionally, a generation unit is adapted to generate a first and a second key, and also adapted to generate a third and a fourth integrity key PhA2 and PvA2. Optionally, the verifying unit is further adapted to verify that the received integrity protection tags PhA and PvA are correct by comparing them with the locally generated integrity protection tags PhA2 and PvA2, respectively.

Further features and benefits of the present invention will become apparent from the detailed description.

BRIEF DESCRIPTION OF THE DRAWINGS

The present invention will now be described in more detail by means of exemplary embodiments and with reference to the accompanying drawings, in which.

DETAILED DESCRIPTION

Briefly described, the present invention provides a solution for enabling a more flexible and secure distribution of security algorithm selection policies, when a communication terminal 100 having an association with a home communication network (HPLMN) 106 is present in a visited communication network (VPLMN) 102, without affecting signalling messages already present according to the mobile standard protocol AKA. Furthermore, the VPLMN as well as the HPLMN will be capable of influencing the policy for which security algorithms to apply for integrity check, encryption, and decryption, as well as which other types of security functions to apply.

A security policy vector Ph associated with the HPLMN 106 is generated in the HPLMN 106 and is sent to the VPLMN 102. Another security policy vector Pv associated with the VPLMN 102 is generated in the VPLMN 102. Each security policy vector Ph and Pv, respectively, defines which security algorithms the respective communication network supports and accepts and also which security functions the respective communication network requires. After the communication terminal 100 has been authenticated in the HPLMN 106, the VPLMN 102 detects which security functions being required and selects security algorithms being supported and accepted by both communication networks HPLMN 106 and VPLMN 102, respectively. The selected security algorithms and detected security functions are then used for providing a secure communication.

Moreover, the terminal will be able to securely verify that the selected security algorithms and the detected security functions are consistent with the security policies of both HPLMN and VPLMN.

The term security algorithm used in this description generally represents any integrity check algorithm as well as any encryption or decryption algorithms. The term security function instead represents any security function required from the communication networks, as encryption, or authorisation check, etc. The present invention may be used for different security policies, e.g. Non-Access Stratum ciphering algorithm policy, Non-Access Stratum integrity algorithm policy, Radio Resource Control ciphering algorithm policy, Radio Resource Control integrity algorithm policy, User Plane ciphering policy, Application layer security algorithms, etc.

The "communication terminal" described in the embodiments could be a mobile phone. However, the skilled person will understand that the described methods and arrangements could be adapted for any other suitable communication terminal present in a visited communication network and communicating with another communication network. For instance, the communication terminal may be a wireless or fixed phone, a computer present in a communication network, a small sensor, etc. The communication networks described below are visited or home public land mobile networks, referred to as VPLMN and HPLMN, respectively. However, the present invention may also be used in any other suitable communication network, e.g. Local Area Networks (LAN), Wide Area Networks (WAN), wireless or fixed data or telephony communication networks, etc. The signalling information messages referred to are standardised messages, e.g. RAND, XRES, and AUTN, which are not necessary to describe in more detail in order to understand the presented embodiments. The signalling messages used could be any signalling messages according to prevailing standards and protocols in the communication networks, in which the present invention can be realised. Herein, integrity protection tags are computed by using an existing MAC-function (Message Authentication Code). The MAC-function is a standardised function which is likewise not necessary to describe here in more detail. For instance, HMAC or CBC-MAC could be used. However, a skilled person can adapt any other functions, suitable for the specific communication networks, for computing the integrity protection tags. If the communication terminal is present in its HPLMN and not in a VPLMN, a corresponding procedure as described above can be applied, although the MME would then be located in the HPLMN. Indeed, though the term MME (associated with a 3GPP EPS network) will be used, any node in charge of security policy and/or user authentication could host the functionality here assumed to reside in the MME.

The security policy vectors Ph, Pv, and P referred to in this description will be vectors with a predetermined number of positions, each position representing a selectable security algorithm, or security function which may be required. In order to explain the structure of the security policy vectors, a case will first be described the case with security policy vectors defining only selectable security algorithms. Below, the case with security policy vectors defining just acceptable security functions is described.

Case 1: Security Algorithms

The security policy vector has a predefined number of positions, each position comprising a value, e.g. "1" if the corresponding security algorithm is accepted by the communication network, and "0" if the corresponding security algorithm is not accepted by the communication network. For instance, if Ph is a vector defining the security policy associated with the home communication network and Ph=[0,1,1], the home communication network accepts only the second and third security algorithms. Correspondingly, if Pv is a vector defining the security algorithm policy associated with the visited communication network and Pv=[1,0,1], the first and third security algorithms are accepted by the visited communication network and so forth. P is a vector defining the combined security policy associated with the HPLMN 106 and the VPLMN 102, i.e. P defines which security algorithms that are accepted by both networks 102, 106. P is calculated by position-wise applying the logical AND-operation on the vectors Ph and Pv, $P=P_h$ AND $P_v$, i.e. for each position i of the vectors defining $P^i=\min(P_h^i,P_v^i)$. Hence, if a communication terminal present in a visited communication network and associated with its home communication network, where the security algorithm policies are defined as Ph=[0,1,1] and Pv=[1,0,1], P will be [0,0,1] and the third security algorithm has to be used for the secured (e.g. encrypted) communication. The communication terminal, given Pv and Ph, should thus perform said AND-operation and check that the third algorithm is indeed the one chosen in the end. Note that if P was generated directly in the HPLMN, while simplifying the processing in the terminal, it would not give the VPLMN much influence on the security algorithm policy. On the other hand, if P was generated locally in the VPLMN, the user terminal would not be able to decide if the VPLMN somehow diverges from the policy of the HPLMN. By dividing the policy into Pv and Ph, it gives flexibility while maintaining the possibility for the terminal to verify that both policies are followed.

Optionally, the security policy vectors will be able to define which security algorithms the communication networks prefer to use rather than the more strict "accept to use". This can be realised by defining the values for the vectors as non-binary quantities, e.g.,

| Value | Algorithm |
|---|---|
| "0" | Not accepted |
| "1" | Accepted |
| "2" | Accepted and preferred |

For instance, if Pv=[1,2,2] and Ph=[0,2,1], P will be [0,2,1], implying that the first security algorithm is not accepted and that the second security algorithm is preferred over the third security algorithm. In a more general case, each component in the vectors could have a value in the set $\{0, 1, \ldots, T-1\}$ where a higher value means "more preferred".

Case 2: Security Functions

Optionally, the security policy vectors Ph, Pv and P, respectively, may instead comprise parameters indicating that certain security functions are required, e.g., if encryption is required the value for the first position will be "1", otherwise "0", and if integrity protection is required the value for the first position will be "1", otherwise "0". In that case, the combined security policy vector P will be calculated by position-wise applying the logical OR-operation on the vectors Ph and Pv, $P=P_h$ OR $P_v$, i.e. for each position i of the vectors defining $P^i=\max(P_h^i,P_v^i)$. For instance, if the HPLMN requires encryption but does not require integrity protection, i.e. the security policy vector Ph=[1,0], and if the VPLMN instead does not require encryption but requires integrity protection, i.e. the security policy vector Pv=[0,1], then P will be [1,1]. This indicates that both encryption and integrity protection are required for the communication.

Note that in this case, it is also possible to have non-binary values, e.g. $\{0, 1, \ldots, T-1\}$ indicating a "strength of requirement" for a given security function.

It should be noted that various combinations of the two different types of security policy vectors, may also be used, defining security algorithms as well as security functions. For instance, if the two first positions of the security policy vector are used for security functions, and the last three positions are used for security algorithms, the logical OR-operation will be used for calculating the first two positions of the combined security vector, and the logical AND-operation will be used for calculating the last three positions of the combined security policy vector, etc.

The values $\{0, 1, \ldots, T-1\}$ are only examples of selectable values and the present invention is not limited in this respect. When defining the security policy vectors, it is optional to use a suitable number of positions for the vectors and suitable values for the positions including negative integers, real or rational numbers, etc., or in general elements from any ordered set.

Figure 2:
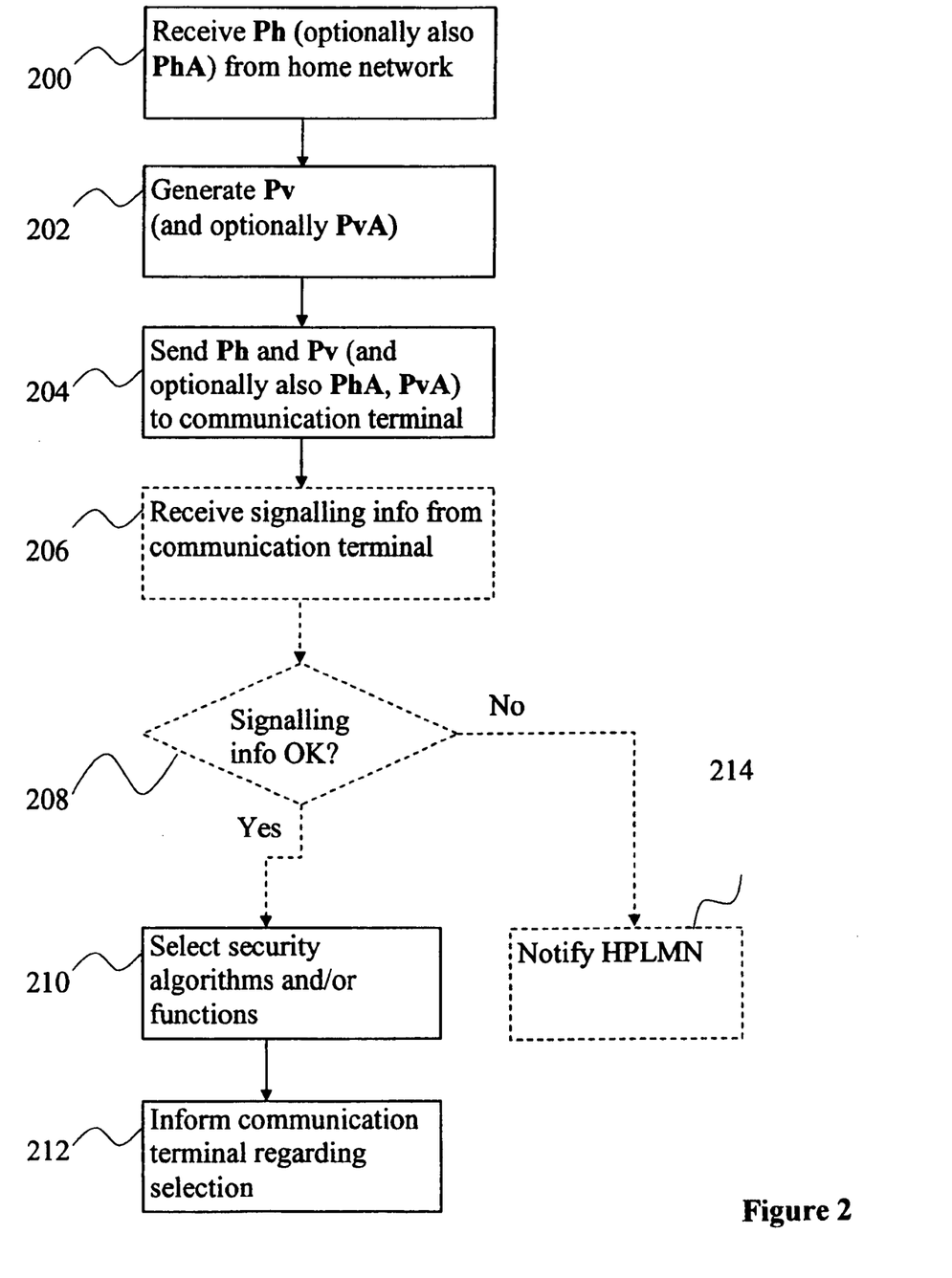
FIG. 2 is a flow chart i illustrating a method for distributing a security policy, in accordance with one embodiment.

A method of distributing a security policy in accordance with an exemplary embodiment of the present invention will now be described, with reference to FIG. 2, illustrating a flow chart with steps executed in a visited communication network (VPLMN).

The procedure actions according to the embodiment may be executed by one (or a combination of) suitable communication network entity/entities. For instance, a Mobility Management Entity (MME) may perform the actions independently or in combination with a Radio Base Station (RBS). However, the skilled person will understand that any other suitable communication network entity (or combination of entities) could be used. In a first step 200, a security policy vector Ph associated with a home communication network 106, is received from the home communication network 106. Optionally, a first set of signalling information messages may also be received in this step, for instance a signalling information message referred to as XRES and other authentication information (known as "quintets" in UMTS). In a next step 202, a security policy vector Pv associated with the visited communication network 102 is generated. In a next step 204, the security policy vector Ph associated with the home communication network, and the security algorithm policy vector Pv associated with the visited communication network, are sent to the communication terminal 100. Optionally, a second set of signalling messages may be sent to the communication terminal 100, e.g. an authentication challenge (RAND).

In one alternative, the procedure may then move over to a step 210 of selecting at least one security algorithm and/or at least one security function to be applied, to achieve a secure communication. In a next step 212, the communication terminal is informed about which security algorithms and/or security functions are selected. The informing is made either directly or indirectly via a Radio Base Station 112.

The selection of security algorithms may be performed by bitwise comparing the security policy vector Ph associated with the home communication network 106 with the security policy vector Pv associated with the visited communication network 102. When a position in both vectors has values indicating that a corresponding security algorithm is at least accepted by both communication networks, the corresponding security algorithm may be selected. The comparison regarding security algorithms may be performed by a bitwise logical AND-operation of Ph and Pv. The selection of security functions may be performed by bitwise comparing the security policy vectors Ph and Pv and selecting which security functions are required by at least one communication network (HPLMN or VPLMN). The comparison regarding security functions may be performed by a bitwise logical OR-operation of Ph and Pv.

However, the skilled person will understand that security algorithms and security functions can be combined in the security policy vectors Ph, Pv, and depending on the combination a suitable process can be determined for selecting security algorithms and/or security functions to be applied. For instance, any suitable (and meaningful) logical operation as AND, OR, XOR, XAND, or any other operation as the min-, or max-operation, etc., may be combined. It may also be possible to assign weights to the policies such that, e.g., each component of the Ph vector is multiplied by a constant factor (e.g. 2) before applying the combination operation. The selection(s) may be performed by forming a combined security policy vector P, by adapting any suitable operation on the security policy vectors Ph, Pv, associated by the communication networks 102, 106, and then selecting at least one security algorithm and/or at least one security function in accordance with the combined security policy vector P. The selection(s) may be performed in different network units, e.g. in a Mobility Management Entity (MME) 104 or in a Radio Base Station (RBS) 112.

An advantage of designing the security policy vectors to comprise values indicating that one security algorithm is preferred over another is that the communication networks may more easily influence the selection of security algorithms. Another advantage is that the described method can be adapted on both MME-algorithms (e.g. Non-Access Stratum (NAS) algorithms), and Radio Base Station (RBS)-algorithms (e.g. Radio Resource Control (RRC) algorithms or User Plane (UP) algorithms).

In an optional intermediate step 206, a third set of signalling messages may be received from the communication terminal 100, according to another alternative. This third set may include an authentication response signalling information message referred to as RES. Furthermore, in another intermediate step 208, a subset of the received third set of signalling information messages may be compared to a subset of the received first set of signalling information messages, e.g. the XRES may be compared with the RES. This comparison may be made to find out if the communication terminal 100 is authenticated for the home communication network. If the compared subsets of signalling information messages are identical, the terminal can be deemed authenticated, and the process according to this alternative can proceed to step 210, described above. On the other hand, if the subsets in step 208 are not identical, the HPLMN may be notified in an optional step 214 that the communication terminal is not authenticated in the HPLMN. It may then be possible for the HPLMN to issue a more liberal security policy.

In another embodiment, different from the embodiment described above, the following procedure actions are added: In step 200, an integrity protection tag PhA, and a "master key" are received from the HPLMN 106. By way of example, the master encryption key referred to throughout this description is the so-called "Kasme". However, any other suitable key may be used as the master key and the present invention is not limited to any particular key(s). The integrity protection tag PhA is dependent on the security policy vector Ph and is generated in the HPLMN by applying the so-called MAC-function on the security policy vector Ph and a specific ciphering key Ck and/or a specific integrity key Ik, i.e. PhA=MAC(Ck,Ik,Ph) where preferably Ck/Ik are known only to HPLMN and the user terminal. Optionally in step 202, an integrity protection tag PvA of the visited communication network 102 may also be generated. The integrity protection tag PvA is generated by applying the MAC-function on the master key Kasme and the security policy vector Pv, i.e. PvA=MAC(Kasme,Pv). However, any other suitable function or parameters may be used for generating the integrity protection tags PhA and PvA. Optionally in step 204 the integrity protection tags PhA, PvA are also sent to the communication terminal 100. This will enable the communication terminal 100 to verify the authenticity of Ph (as coming from HPLMN) and Pv (as coming from VPLMN). In other words, even a malicious VPLMN is not able to "fake" the policy of the HPLMN, since it does not have access to the ciphering key Ck or integrity key Ik.

Figure 3:
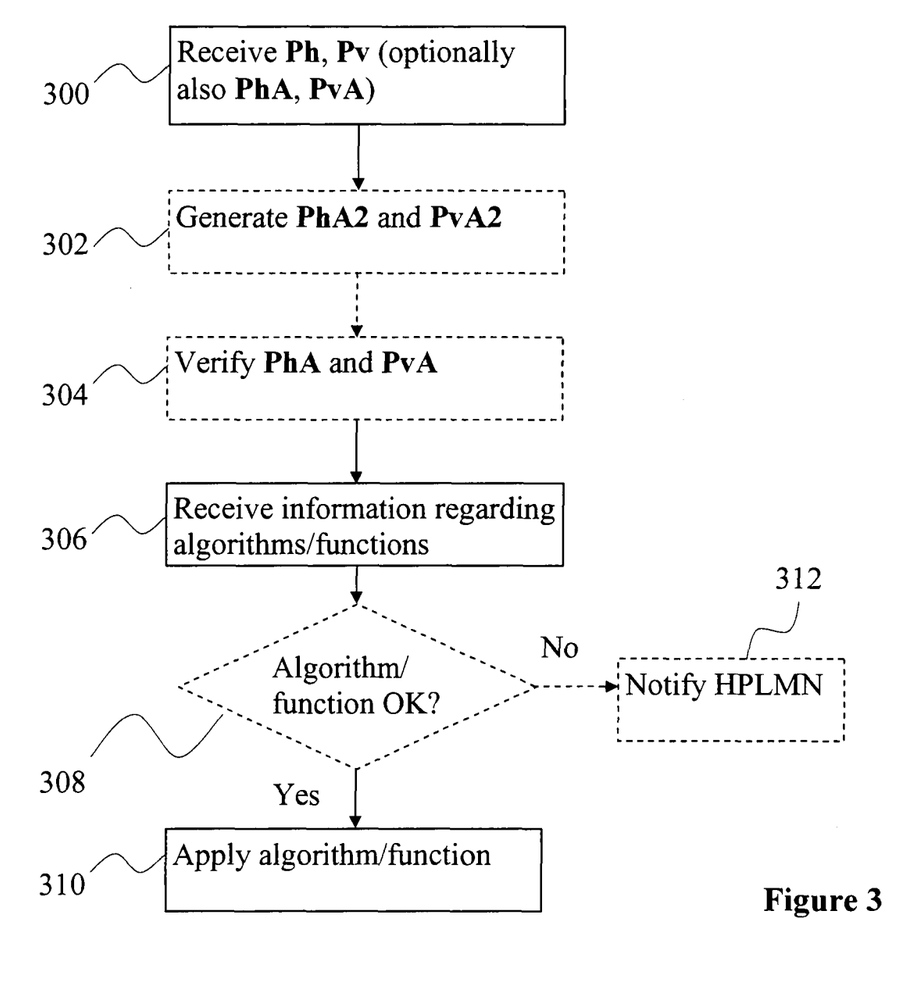
FIG. 3 is a flow chart i illustrating a method for distributing a security policy, in accordance with another embodiment.

A method of distributing a security policy in accordance with an another exemplary embodiment will now be described with reference to FIG. 3, illustrating a flow chart with steps executed in a communication terminal. In a first step 300, a security policy vector Ph associated with a home communication network (HPLMN) 106 and a security policy vector Pv associated with a visited communication network (VPLMN) 102 are received from the HPLMN 106. Optionally, various signalling messages may also be received from the VPLMN 102. Furthermore, an authentication verification of the HPLMN 106 to the communication terminal 100 may be performed in an additional step (not shown). The authentication verification may be performed by exchanging different standardised signalling messages between internal units in the communication terminal 100. However, the authentication verification is a standardised process, and will therefore not be described here in more detail. The VPLMN 102 may optionally receive a signalling message referred to as RES from the communication terminal 100. In a next step 306, the communication terminal 100 receives from the VPLMN 102 information regarding which security algorithms and/or security functions have been selected by the VPLMN 102. The procedure may then move over to a step 310 where the communication terminal 100 then adapts the selected security algorithms and/or security functions for the present communication.

In a next step 308 is verified that the selected security algorithms and/or security functions are in accordance with the security policy vectors Ph, Pv of both the HPLMN 106 and the VPLMN 102. For instance, a security algorithm or a security function could be deemed verified if the value for a position in the received security policy vector Ph, regarding the HPLMN 106, and the value for the corresponding position of the received security policy vector Pv, regarding the VPLMN 102, satisfy a binary relation. The binary relation may be satisfied if, e.g., a logical AND-operation (or any other suitable logical operation) on the value of the position in the security policy vectors Ph and Pv equals 1. If the selected security algorithms and/or security functions are verified in accordance with the security policy vectors Ph and Pv, the process continues with step 310, wherein the communication terminal 100 adapts the selected security functions and or security algorithms. On the other hand, if the selected security algorithms and/or security functions can not verified in step 308, the HPLMN 106 may be notified in an optional step 312. It may then be possible for the HPLMN 106 to issue a more liberal security policy, as described above.

In another embodiment, different from the previous embodiment described above, the following procedure actions are added: In step 300, a first integrity protection tag PhA associated with the HPLMN 106 and a second integrity protection tag PvA associated with the VPLMN 102, are received from the VPLMN 102. In an additional step 302, a first and a second key, a third integrity protection tag PhA2, and a fourth integrity protection tag PvA2 are generated. The integrity protection tag PhA2 is dependent on at least the security policy vector Ph and a first key (e.g. Ck and/or Ik), and the integrity protection tag PvA2 is dependent on the second key Kasme and is also dependent on at least the security policy vector Pv. Furthermore, in another additional step 304 the received integrity protection tags PhA and PvA, respectively, are verified against the generated integrity protection tags PhA2 and PvA2, respectively. An advantage with the verifying step 304 is that the communication terminal 100 may be able to verify that the received integrity policy vectors PhA and PvA, respectively, originates from the correct HPLMN 106 and VPLMN 102, respectively.

Figure 4:
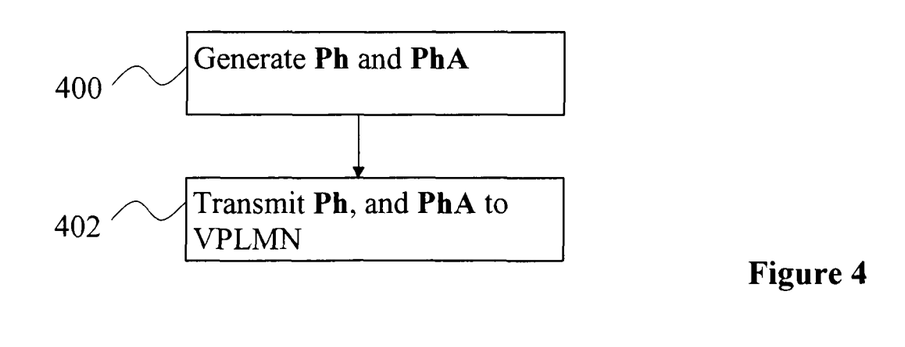
FIG. 4 is a flow chart i illustrating a method for distributing a security policy, in accordance with yet another embodiment.

A method of distributing a security policy in accordance with an another exemplary embodiment will now be described, with reference to FIG. 4, illustrating a flow chart with steps executed in home communication network (HPLMN) 106. The procedure actions according to the embodiment may be executed in a communication network entity, e.g. a Home Subscriber Server (HSS). However, a skilled person will understand that any other suitable communication network entity could be used. In a first step 400, a security policy vector Ph associated with the HPLMN 106 is generated. A first and a second key and an integrity protection tag PhA are also generated in the step 400. The integrity protection tag PhA is dependent on at least the security policy vector Ph and the first key. In a final step 402, the security policy vector Ph, the second key Kasme and the integrity protection tag PhA are transmitted to visited communication network (VPLMN) 102.

Figure 5A:
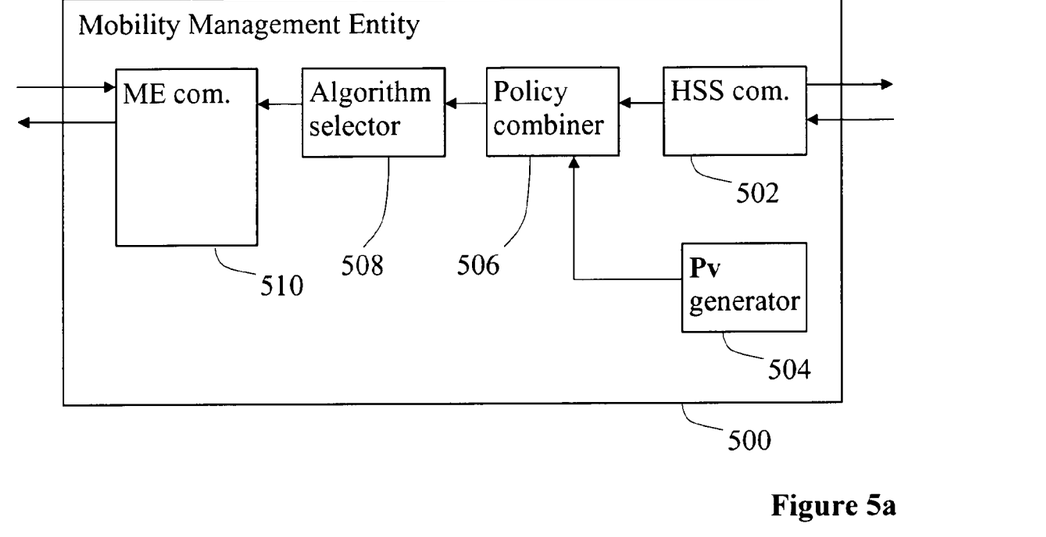
FIG. 5a is a block diagram illustrating an arrangement for distributing a security policy, in accordance with yet another embodiment.

A communication network entity for providing security for a communication terminal 100 in accordance with the present invention will now be described, with reference to a block diagram shown in FIG. 5a and with further reference to FIG. 1. In this exemplary embodiment, a Mobility Management Entity (MME) 500 is used for managing the connections with a communication terminal 100 present in a communication network 102. Here, the communication terminal 100 is present in a visited communication network (VPLMN) 102, but has an association, such as e.g. a mobile subscription, with a home communication network (HPLMN) 106. A first communication unit 502 in the MME 500 receives from the HPLMN 106, a first security policy vector Ph, associated with the HPLMN 106. Optionally, the first communication unit 502 may also receive a master key Kasme and a first integrity protection tag PhA, both being associated with the HPLMN 106. The security policy vector Ph might have been transmitted to the MME 500 by a Home Subscriber Server (HSS) 108 in the HPLMN 106. A generation unit 504 then generates a security policy vector Pv, associated with the VPLMN 102. Optionally, the generation unit 504 may also generate a second integrity protection tag PvA. The security policy vectors Ph and Pv (and optionally also the integrity protection tags PhA and PvA) are transmitted to the communication terminal by a second communication unit 510. The security policy vectors Ph and Pv will further be combined into a combined security policy vector P by a combination unit 506. Furthermore, a selection unit 508 selects at least one security algorithm and/or at least one security function. Finally, the second communication unit 510 informs the communication terminal 100, which security algorithms and/or security functions have been selected. The second communication unit 510 is adapted to either inform the communication terminal 100 directly, or indirectly via a Radio Base Station 112.

For certain network algorithms e.g. Radio Base Station algorithms, the selection of security algorithms and/or security functions may be performed in a Radio Base Station (RBS) 112.

Figure 5B:
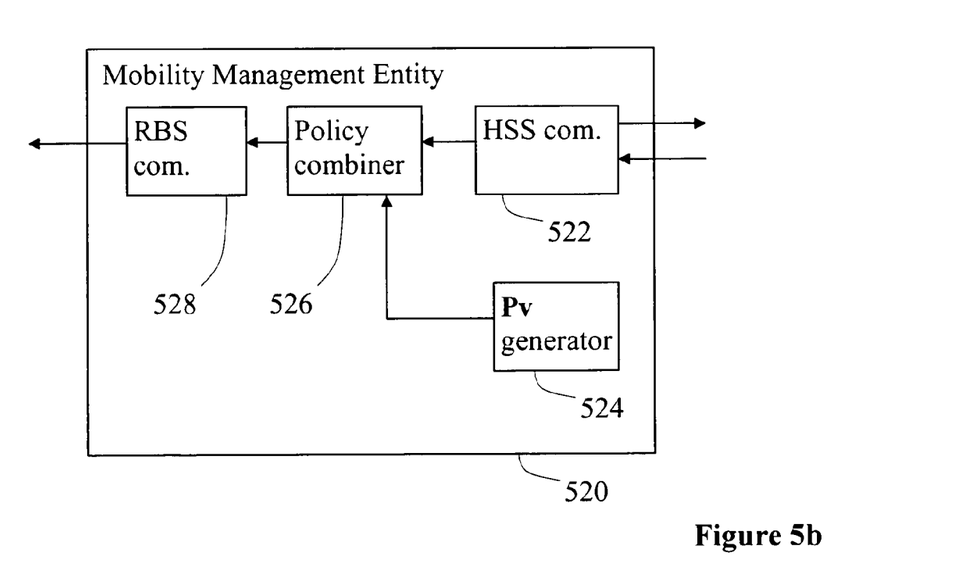
FIG. 5b is a block diagram illustrating an arrangement for distributing a security policy, in accordance with yet another embodiment.

Another embodiment different from the embodiment described above, will therefore be described with reference to FIG. 5b and with further reference to FIG. 1. In this embodiment, a Mobility Management Entity (MME) 520 is used for managing the connections with a communication terminal 100 present in a communication network 102. Here, the communication terminal 100 is present in a visited communication network (VPLMN) 102, but has an association with a home communication network (HPLMN) 106. A first communication unit 522 in the MME 520 receives from the HPLMN 106, a first security policy vector Ph, associated with the HPLMN 106. Optionally, the first communication unit 522 may also receive a master key Kasme and a first integrity protection tag PhA, both being associated with the first communication network HPLMN 106. A generation unit 524 then generates a security policy vector Pv, associated with the VPLMN 102. Optionally, the generation unit 524 may also generate a second integrity protection tag PvA. The security policy vectors Ph and Pv are combined into a combined security policy vector P by a combination unit 526. Finally, a second communication unit 528 transmits the combined security policy vector P to the RBS 112. Optionally, the second communication unit 528 may also transmit to the RBS 112 the security policy vectors Ph, Pv and/or the integrity protection tags PhA, PvA. Even though an MME and an RBS are used in the examples described above, any other suitable communication network entities may be used instead in the manner described.

Figure 6:
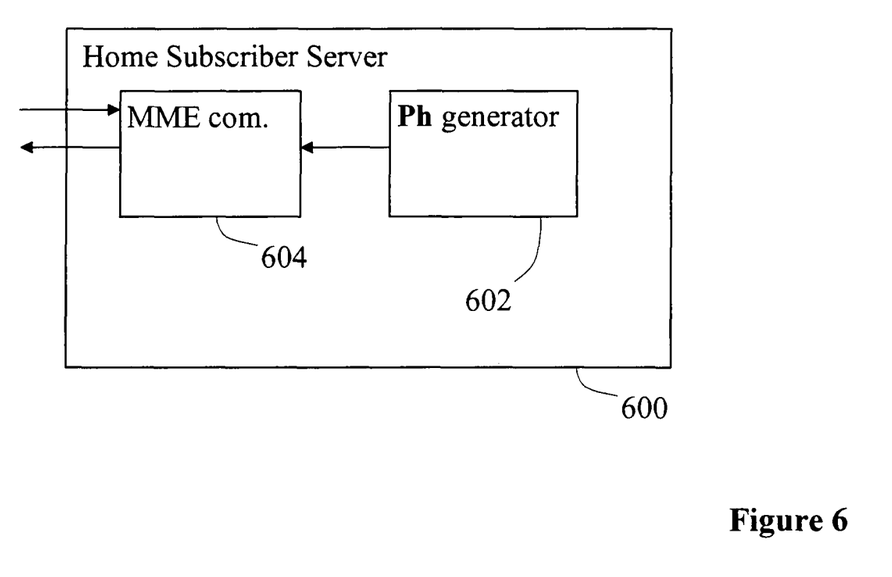
FIG. 6 is a block diagram illustrating an arrangement for distributing a security policy, in accordance with yet another embodiment.

An communication network entity for providing security for a communication terminal 100 in accordance with the present invention will now be described, with reference to a block diagram shown in FIG. 6. A Home Subscriber Server (HSS) 600 in a home communication network (HPLMN) stores information regarding the subscribers of the HPLMN 106. Even though an HHS is used in this example, any other suitable communication network entity may be used instead in the manner described. A generation unit 602 generates a security policy vector Ph, defining the security policy of the HPLMN 106. The generation unit 602 further generates a first and a second key, and an integrity protection tag PhA. The integrity protection tag PhA is dependent on at least the security policy vector Ph and the first key. A communication unit 602 then transmits the security policy vector Ph, the integrity protection tag PhA, and the second key Kasme to the visited communication network (VPLMN) 102.

Figure 7:
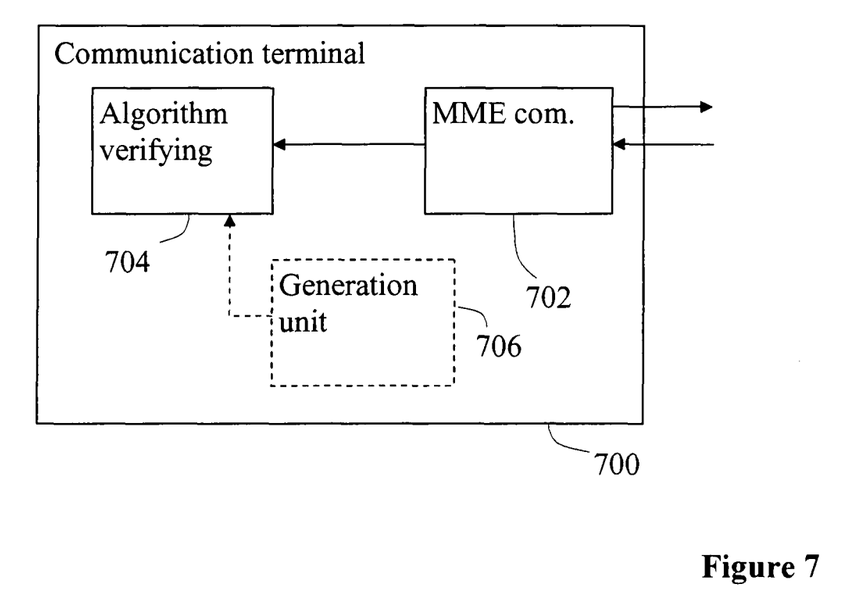
FIG. 7 is a block diagram illustrating an arrangement for distributing a security policy, in accordance with yet another embodiment.

An arrangement in a communication terminal 700 for providing security for the communication terminal 700 in accordance with the present invention will now be described, with reference to FIG. 7 illustrating a block diagram and with further reference to FIG. 1. The communication terminal 700 (in FIG. 1 referred to as 100) has an association with a HPLMN 106 but is present in a VPLMN 102. A communication unit 702 receives from the VPLMN 102 a first security policy vector Ph associated with the HPLMN 106, a second security policy vector Pv associated with the VPLMN 102. Optionally, the communication unit 702 in addition receives an integrity protection tag PhA and another integrity protection tag PvA. Furthermore, the communication unit 702 receives at least one security algorithm and/or at least one security function from the VPLMN 102. A verifying unit 704 verifies that the received security algorithms and/or security functions are in accordance with the received security policy vectors Ph and Pv. An optional generation unit 706 may generate: a first and a second key, an integrity protection tag PhA2, and another integrity protection tag PvA2. Optionally, the verifying unit 704 may verify that the received integrity protection tags PhA and PvA, respectively, are identical the generated integrity protection tags PhA2 and PvA2, respectively.

Figure 8:
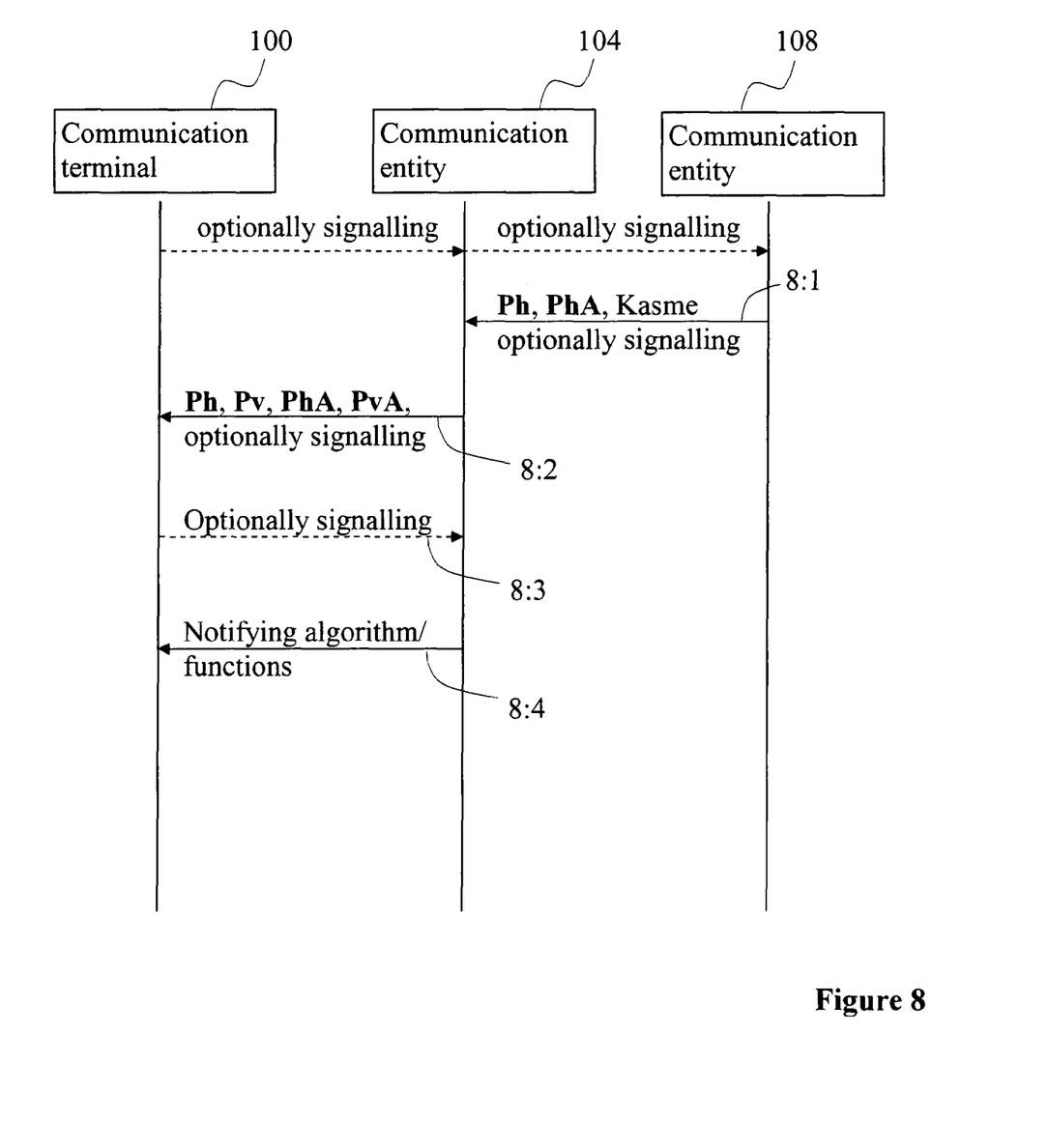
FIG. 8 is a signalling chart illustrating the signals being transmitted when applying the present invention, in accordance with the embodiments.

A signalling chart is shown in FIG. 8 and will further explain the present invention (also with reference to earlier figures). The signalling chart comprises three nodes, a first communication entity 108 present in a home communication network 106, a second communication entity 104 present in a visited communication network 102, and a communication terminal 100 having an association with the home communication network 106, but being present in a visited communication network 102. Prior to the sequences described below, various signalling messages might have been exchanged between the different communication nodes. In sequence 8:1 (corresponding to step 402 and step 200), the security policy vector Ph and optionally the integrity protection tag PhA and the second key Kasme are transmitted to a second communication network entity 104 in a visited communication network (VPLMN) 102. In sequence 8:2 (corresponding to step 204 and step 300), the first and second security policy vectors Ph, Pv and optionally the first and second integrity protection keys PhA, PvA are transmitted to the communication terminal 100. In an optional sequence 8:3 (not necessary), the communication terminal 100 sends various signalling messages to the second communication network entity 104, e.g. an signalling message named RES. In sequence 8:4 (corresponding to step 212 and step 306), the second communication network entity 104 transmits information regarding which security algorithms and/or which security functions have been selected.

Optionally, in the signalling sequences may various signalling messages be transferred. These various signalling messages are not described here.

While the invention has been described with reference to specific exemplary embodiments, the description is in general only intended to illustrate the inventive concept and should not be taken as limiting the scope of invention. Although mobile phones, and mobile communication networks have been used throughout when describing the above embodiments, any other communication terminals and communication networks may be used in the manner described. Furthermore, although Mobile Management Entities, Home Subscriber Servers, and Radio Base Stations have been used when describing the above embodiments, any other suitable communication network entities may also be used in the manner described. The invention is generally defined by the following independent claims.

The invention claimed is:

1. A method of providing security for a communication terminal having an association with a first communication network but being present in a second communication network, the method comprising the following steps being executed by a communication network entity in the second communication network:
  receiving a first security policy vector Ph associated with the first communication network from the first communication network, the first security policy vector Ph comprising a predefined number of values relating to at least one of a security algorithm and a security function;
  generating a second security policy vector Pv associated with the second communication network, the second security vector Pv comprising the same predefined number of values as the first security policy vector Ph, the values also relating to at least one of a security algorithm and a security function;
  transmitting the first security policy vector Ph and the second security vector Pv to the communication terminal;
  selecting at least one security algorithm or at least one security function in accordance with the first security policy vector Ph and the second security policy vector Pv; and
  informing the communication terminal the result of the selection.

2. The method according to claim 1, wherein:
  receiving a first security policy vector Ph further comprises receiving a master key, and receiving a first integrity protection tag PhA, the first integrity protection tag PhA being dependent on at least the first security algorithm policy vector Ph;
  generating a second security policy vector Pv further comprises generating a second integrity protection tag PvA, dependent on at least the second security algorithm vector Pv and the master key; and
  transmitting the first and second security policy vectors Ph and further comprises transmitting the first integrity protection tag PhA and the second integrity protection tag PvA to the communication terminal.

3. A method of providing security for a communication terminal having an association with a first communication network but being present in a second communication network, the method comprising the following steps being executed by a communication network entity in the second communication network:
  receiving a first security policy vector Ph associated with the first communication network from the first communication network, the first security policy vector Ph comprising a predefined number of values relating to at least one of a security algorithm and a security function;

generating a second security policy vector Pv associated with the second communication network, the second security vector Pv comprising the same predefined number of values as the first security policy vector Ph, the values also relating to at least one of a security algorithm and a security function;

transmitting the first security policy vector Ph and the second security vector Pv to the communication terminal;

generating a third security policy vector P, comprising values relating to at least one of a security algorithm and a security function by combining the first security policy vector Ph and the second security policy vector Pv; and transmitting the third security policy vector P to another communication network entity.

4. The method according to claim 3, wherein:

receiving a first security policy vector Ph further comprises receiving a master key, and receiving a first integrity protection tag PhA, the first integrity protection tag PhA being dependent on at least the first security algorithm policy vector Ph;

generating a second security policy vector Pv further comprises generating a second integrity protection tag PvA, dependent on at least the second security algorithm vector Pv and the master key; and transmitting the first and second security policy vectors Ph and further comprises transmitting the first integrity protection tag PhA and the second integrity protection tag PvA to the communication terminal.

5. A method of providing security for a communication terminal having an association with a first communication network but being present in a second communication network, the method comprising the following steps being executed by a communication network entity in the first communication network:

generating a first security policy vector Ph associated with the first communication network, the first security policy vector Ph comprising a predefined number of values relating to at least one of a security algorithm and a security function;

generating a first and a second key;

generating a first integrity protection tag PhA, the first integrity protection tag PhA being dependent on at least the first security algorithm vector Ph and the first key; and transmitting the first security policy vector Ph, the first integrity protection tag PhA, and the second key to the second communication network.

6. A method of providing security for a communication terminal having an association with a first communication network but being present in a second communication network, the method comprising the following steps being executed in the communication terminal:

receiving a first security policy vector Ph associated with the first communication network, and a second security policy vector Pv associated with the second communication network, the security policy vectors each comprising values relating to at least one of a security algorithm and a security function;

receiving information from the second communication network identifying at least one security algorithm or at least one security function that has been selected and should be applied; and verifying, in accordance with the first security policy vector Ph and the second security policy vector Pv, the selected security algorithms or selected security functions.

7. The method of claim 6, wherein receiving first and second security policy vectors Ph, Pv further comprises receiving a first integrity protection tag PhA dependent on at least the first security algorithm vector Ph, and a second integrity protection tag PvA dependent on at least the second security algorithm vector Pv, and further comprising:

generating a first and a second key;

generating a third integrity protection tag PhA2, dependent on at least the first security policy vector Ph and the first key;

generating a fourth integrity protection tag PvA2, dependent on at least the second security policy vector Pv and the second key; and verifying that the third integrity protection tag PhA2 and the first integrity protection tag PhA are identical, and that the fourth integrity protection tag PvA2 and the second integrity protection tag PvA are identical.

8. A communication network entity for providing security for a communication terminal having an association with a first communication network but being present in a second communication network, the entity comprising:

a first communication unit adapted to receive a first security policy vector Ph from the first communication network, the first security policy vector Ph comprising a predefined number of values relating to at least one of a security algorithm and a security function;

a generation unit adapted to generate a second security policy vector Pv, the second security policy vector Pv comprising a predefined number of values relating to at least one of a security algorithm and a security function;

a combination unit adapted to combine the first security policy vector Ph and the second security policy vector Pv into a combined security policy vector P;

a selection unit adapted to select at least one security algorithm and/or at least one security function; and a second communication unit, adapted to transmit to a communication terminal a first security policy vector Ph and a second security policy vector Pv, and further adapted to transmit the output from the selection unit to the communication terminal.

9. The entity of claim 8, wherein:

the first communication unit is further adapted to receive a key and a first integrity protection tag PhA from the first communication network; and the generation unit is further adapted to generate a second integrity protection tag PvA based on the security policy vector Pv and the key.

10. A communication network entity for providing security for a communication terminal having an association with a first communication network but being present in a second communication network, the entity comprising:

a first communication unit adapted to receive a first security policy vector Ph from the first communication network, the first security policy vector Ph comprising a predefined number of values relating to at least one of a security algorithm and a security function;

a generation unit adapted to generate a second security policy vector Pv, the second security policy vector Pv comprising a predefined number of values relating to at least one of a security algorithm and a security function;

a combination unit adapted to combine the first security policy vector Ph and the second security policy vector Pv into a combined security policy vector P; and a second communication unit adapted to transmit the combined security policy vector P to a radio base station.

11. The entity of claim 10, wherein:
the first communication unit is further adapted to receive a key and a first integrity protection tag PhA from the first communication network; and
the generation unit is further adapted to generate a second integrity protection tag PvA based on the security policy vector Pv and the key.

12. A communication network entity for providing security for a communication terminal having an association with a first communication network but being present in a second communication network, the communication network entity comprising:
a generation unit adapted to generate a first security policy vector Ph comprising a predefined number of values relating to at least one of a security algorithm and a security function, first and second keys, and an integrity protection tag PhA based on the security policy vector Ph and at least the first key; and
a communication unit adapted to transmit the first security policy vector Ph, the second key, and the integrity protection tag PhA to a communication network.

13. A communication terminal comprising:
a communication unit adapted to receive a first security policy vector Ph and a second security policy vector Pv, each security policy vector comprising a predefined number of values relating to at least one of a security algorithm and a security function and further adapted to receive information from a communication network regarding which security algorithms or security functions to apply;
a first verification unit adapted to verify that the security algorithms or security functions are in accordance with the first security policy vector Ph and the second security policy vector Pv.

14. The terminal of claim 13, wherein the communication unit is further adapted to receive a first integrity protection tag PhA and a second integrity protection tag PvA, and further comprising:
a generation unit adapted to generate a first and a second key, a third integrity protection tag PhA2, and a fourth integrity protection tag PvA2, the verifying unit being further adapted to verify that the first integrity protection tag PhA is identical to the third integrity protection tag PhA2, and that the second integrity protection tag PvA is identical to the fourth integrity protection tag PvA2.

* * * * *